April 5, 1955  B. WALKER  2,705,515

DRILL WITH BURNISHING ATTACHMENT

Filed Oct. 28, 1949

INVENTOR.

Brooks Walker

United States Patent Office 2,705,515
Patented Apr. 5, 1955

2,705,515

DRILL WITH BURNISHING ATTACHMENT

Brooks Walker, Piedmont, Calif.

Application October 28, 1949, Serial No. 124,076

1 Claim. (Cl. 145—116)

This invention pertains to an improved drill with a drilling attachment which may be attached to the drill, or forms an integral part thereof, which forms a smooth hole through a compressible material, such as wood, fiber, plastic and the like, with a rounded upper surface where the drill first enters the hole, preferably formed in a radius which is tangent to the smooth drilled hole and the surface of the material which is being drilled, so that a cord running through the hole and after passing along the surface of the material to be drilled will have a smooth path over which to travel while being turned in a direction substantially at right angles. This has particular application to use in Venetian blinds and other structures where a pulley is ordinarily used for changing the direction of the cord which is working under tension. These pulleys are costly to install, tend to squeak and usually are of a smaller radius than the radius which can be placed on the upper end of a hole by means of the drill and attachment described in this invention. Another object of the invention is to provide means whereby a hole may be drilled, reamed and polished and a radius provided at the entering face of the hole, and at the same time a radius or chamfered edge provided at the end of the hole where the drill passes through the material being drilled, so that it will not be necessary to turn the material over and chamfer the lower edge. The provision of a hole as provided with tools described in this invention accomplishes economies in providing cord or rope turning devices which are free from squeaks, do not materially wear the cord or are low in friction due to the polished surface over which the cord turns and has great speed of manufacture and economy of materials. Other features were as we pointed out in the specifications and claims.

I have illustrated my invention the best form in which I have contemplated applying my invention as illustrated in the accompanying drawings forming part of this specification, in which:

Figure 1 is an elevation view partly cut away illustrating one form of my invention.

Figure 1–A is a side elevational view of the structure shown in Fig. 1.

In all figures, similar numerals refer to corresponding parts in the various views or figures.

Figure 1:
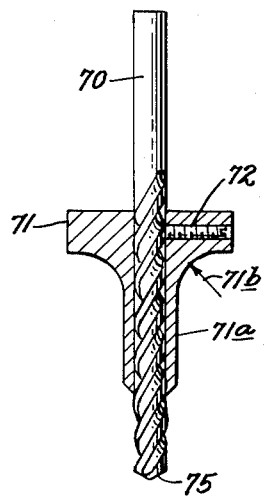

In Figure 1, I have illustrated a drill 70 with a drilling point 75 of any suitable or usual form. On this drill has been attached an adapter or shank 71 which is secured to the drill by set screw 72 or other suitable means. The lower end of the shank 71 is formed as a thin circular enlargement of the drill at 71a for slightly enlarging and polishing the hole which is drilled in a compressible material such as wood or fiber or plastic. The upper end of shank 71 is formed in a radius 71b which burnishes and polishes the upper end of the hole which is being drilled and prepared in a radius tangent to the enlarged hole and tangent to the upper face of the materials being drilled.

Figure 2:
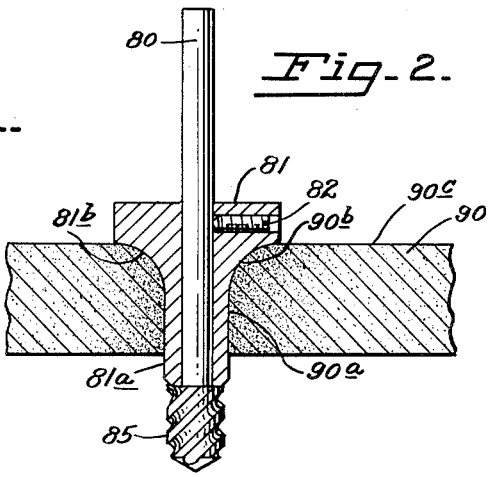
Figure 2 is an elevation view partly cut away showing another form of my invention.

In Figure 2, I have shown a modification of the invention in which a step shank drill 80 has an enlarged point 85. The drill shank adapter 81 is attached as in Figure 1 by a set screw 82, or any other suitable means may be used. The lower portion of the adapter forms a very slight enlargement of the hole as drilled by the lower end of the drill 85 in which the hole is reamed out slightly and polished by straight section 81a. The upper end of the hole which is being drilled is compressed, reamed and polished by the radius forming portion 81b which forms a radius in the material 90 which is being drilled between the hole which is being drilled and reamed at 90a, so that the radius portion 90b is substantially tangent with the hole portion 90a and the upper surface 90c of the material being drilled. The advantage of the construction shown in Figure 2 over that shown in Figure 1 is that the hole burnishing and polishing portion can be thicker when used with a stepped drill and can form a slighter enlargement of the drilled hole when reaming and polishing than is possible with the construction shown in Figure 1 which is more suitable for a more highly compressible material, while the construction shown in Figure 2 is suitable for preparing a hole in denser material which might split if a hole was going to be reamed substantially larger than the drilled diameter. The attachments 71 and 81 shown in Figures 1 and 2 should preferably be of high-speed, heat-resistant material as their relatively smooth surfaces will tend to get quite hot while drilling and preparing repeated holes (which temperature is beneficial to the burnishing and polishing operation) but the material should be such as will withstand this use and temperature over a continued operation.

Figure 4:
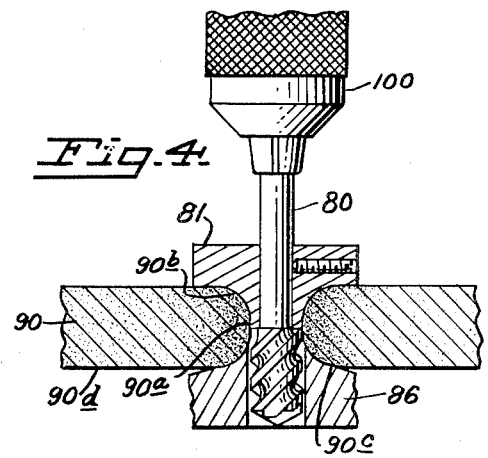
Figure 4 is a plan view partly cut away showing another form of the invention.
Figure 1A:
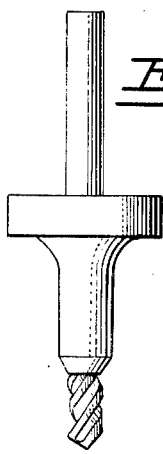
Figure 3:
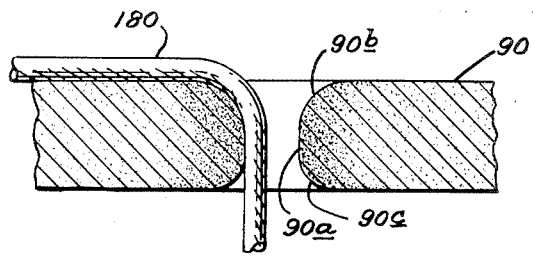
Figure 3 is a plan view partly cut away showing a portion of the material which has been drilled with a cord running through the drilled and prepared hole.

In Figure 4, I have shown a drill similar to that shown in Figure 2 but with the drill being driven by a chuck 100 and a usual drill press not shown in this illustration. The main point of difference in Figure 4 is that a base plate or drill guide 86 is shown in which the portion immediately adjacent to the place where the drill passes through is raised on a radius to press a radial fillet into the lower face or face 90d of the material 90 which is being drilled and prepared by the tool and base plate. This lower fillet may be formed by a stationary base plate or the base plate may be rotated by separate power so that the lower fillet or chamfered face of the hole which is being drilled in the material 90 will be properly rounded and preferably burnished by the pressure of the drilling and polishing operation of the drill 80 and the adapter 81. In Figure 3, I have shown a prepared hole 90a, b, and c in material 90 with a drilled, reamed and polished hole with rounded surfaces at the upper and lower faces for the free passage of cord 180 through said hole, so that a low friction anti-squeak cord turning aperture is provided through the drilled and reamed material 90 which might be one of the rails of a Venetian blind or other material through which it is desired that an operating cord shall pass and change direction while passing without undue friction and without the necessity of incorporating pulleys and the like. The combined compressing, shaping and burnishing tools above described have smooth operating surfaces as is indicated in Fig. 1–A and the holes in the compressible material are formed by an initial boring by the drill and an immediately subsequent compressing of the walls of the initially formed holes by the burnishing tools to the shapes of the working surfaces thereof, the material adjacent the holes being compressed as is indicated by stipling in Figs. 2, 3 and 4. Other features of the invention will be more clearly pointed out in the attached claim.

I claim as my invention:

In a tool for boring and shaping apertures in non-metallic material including a drill having a driving shank and a drill point at one end thereof, the improvement comprising in combination with said shank and drill point, of a material compressing and finishing cylindrical body member on said shank and comprising an annular head portion having a reduced cylindrical extension co-axial with the axis of the drill and of substantially less diameter than said head portion, said body member being rigidly secured to said drill shank with said drill point disposed in advance of said cylindrical extension, and the outer surfaces of said head and cylindrical extension being connected by an axially concave surface, whereby upon operation of the drill point in the formation of said shaped and hard finished aperture in the material said cylindrical extension will follow the drill point into the aperture formed thereby and will progressively compress, shape and finish the material surrounding the drilled aperture as the drill and body member are advanced through the material producing the desired shaped and hard finished aperture.

References Cited in the file of this patent

UNITED STATES PATENTS

| | | |
|---|---|---|
| 202,618 | Wild | Apr. 16, 1878 |
| 716,441 | Latham | Dec. 23, 1902 |
| 720,950 | McWeeney | Feb. 17, 1903 |
| 1,585,657 | Ewell et al. | May 25, 1926 |
| 1,795,358 | Arndt | Mar. 10, 1931 |
| 2,322,612 | Wright | June 22, 1943 |
| 2,344,143 | Harding | Mar. 14, 1944 |

FOREIGN PATENTS

| | | |
|---|---|---|
| 142 | Australia | Jan. 15, 1926 |